United States Patent [19]

Ono

[11] Patent Number: 5,042,825
[45] Date of Patent: Aug. 27, 1991

[54] COMBINED OIL RING ASSEMBLY

[75] Inventor: Sumio Ono, Kashiwazaki, Japan

[73] Assignee: Kabushiki Kaisha Riken, Tokyo, Japan

[21] Appl. No.: 436,606

[22] Filed: Nov. 15, 1989

[51] Int. Cl.$^5$ ............................................. F16J 9/06
[52] U.S. Cl. ..................................... 277/139; 277/141
[58] Field of Search ........................ 277/139, 140, 141

[56] References Cited

U.S. PATENT DOCUMENTS

| 2,789,872 | 4/1957 | Olson | 277/139 |
|---|---|---|---|
| 2,907,615 | 10/1959 | Duesenberg | 277/139 |
| 3,353,830 | 11/1967 | Bell | 277/139 X |
| 4,722,535 | 2/1988 | Maeda et al. | 277/140 X |

FOREIGN PATENT DOCUMENTS 810247  3/1959  United Kingdom ................ 277/139

Primary Examiner—Allan N. Shoap
Attorney, Agent, or Firm—Finnegan, Henderson, Farabow, Garrett & Dunner

[57] ABSTRACT

A combined oil ring assembly including an expander and a pair of side rails. The expander is formed in the shape of a plurality of corrugations having a plurality of oil releasing bores and cut-out portions. The circumferential lengths of the oil releasing bores in the expander that are located at least between the opposed ends of the expander and the ear portions nearest to the opposed ends as well as between the nearest ear portions and the next ear portions are shorter than that of the other oil releasing bores.

4 Claims, 2 Drawing Sheets

COMBINED OIL RING ASSEMBLY

BACKGROUND OF THE INVENTION

The present invention relates to a combined oil ring assembly designed to prevent breakage of the expander and improve its fatigue resistant properties. The combined oil ring assembly or oil control piston ring includes an expander and side rails seated on upper and lower surfaces of the expander, which assembly fits into the groove of a reciprocating piston primarily employed in internal combustion engines. The outer peripheral edges of the side rails contact the inner wall of the cylinder and prevent leakage of oil due to a spring-like property of the expander.

Description of the Prior Art

As shown in FIGS. 2-4, a combined oil ring assembly 1 comprises a split ring expander 5 having a base portion 2 extending circumferentially and formed with a plurality of corrugations in the radially inward and outward direction. The expander is further provided in series with ear portions 3 and seating portions 4 spaced from each other in the circumferential direction on the lower and the upper sides of the base portion, respectively. The assembly further includes a pair of side rails 6 that rest on seating portions 4 with their inner circumferential surfaces abutting ear portions 3. As shown in FIG. 3, the base portion of the expander 5 of the prior art has a plurality of elongated openings or oblong bores 8, 8' that are elongated in the circumferential direction, the bores serving to release oil contained therein. The bores 8' of the split ring expander adjacent to its opposing ends 7 typically have a length half of that of the other oil releasing bores 8. The end portions or side edges of adjacent oil releasing bores 8 opposing each other are located on a line connecting the side edges of the upper and lower seating portions 4.

A conventional expander 5 has the oil releasing bores or openings 8 of length (l=2 mm) as measured from said line and the openings 8' of length (l=1 mm) near the opposed ends 7. The expander 5 which is thus constituted may be formed from a strip as shown in FIG. 3. As is apparent from FIG. 3, semicircular cut-out portions 3a are provided on the opposite sides of each ear portion 3 at their upper and lower locations. This is so the side rails 6 may better contact the inner circumferential surface of the cylinder and prevent the piston from wobbling or deviating.

As shown in FIG. 4, the base portion is formed into corrugations with the ear portions 3 on the inner circumference of the corrugations and the seating portions 4 on the outer circumference of the corrugations. Then the opposite ends 7 of the base portion 2 are joined together in abutting relationship.

However, a problem is encountered in combined oil ring assemblies of the prior art because the portion of the strip adjacent the ear portions 3 which are nearest to the abutting ends 7, are susceptible to breaking. This is presumably due to the shape and abutting relationship of the end portions 7.

SUMMARY OF THE INVENTION

Accordingly an object of the present invention is to minimize or avoid such breakage in the regions of the strip nearest its abutting ends.

According to the present invention, the foregoing object is attained by eliminating the upper and lower cut-out portions at least on the sides of the ear portions located nearest the abutting end portions and by making the circumferential length of the oil releasing bores located between the abutting end portions and the ear portions nearest to said abutting portions as well as between said nearest ear portions and the next ear portions shorter than those of the other oil releasing bores.

Since there are no cut-out portions near the upper and lower ear portions adjacent to the abutting portions and the circumferential length of the oil releasing bores near such ear portions is shorter than the others, when the abutting portions are in abutting contact with each other, the dimensions between such ear portions and the edges of the oil releasing bores is larger than before, whereby stress concentration in this area is reduced.

BRIEF DESCRIPTION OF THE DRAWINGS

The present invention may be more clearly understood from the following description of a preferred embodiment taken in conjunction with the accompanying drawings in which.

DESCRIPTION OF THE PREFERRED EMBODIMENT

Figure 1:
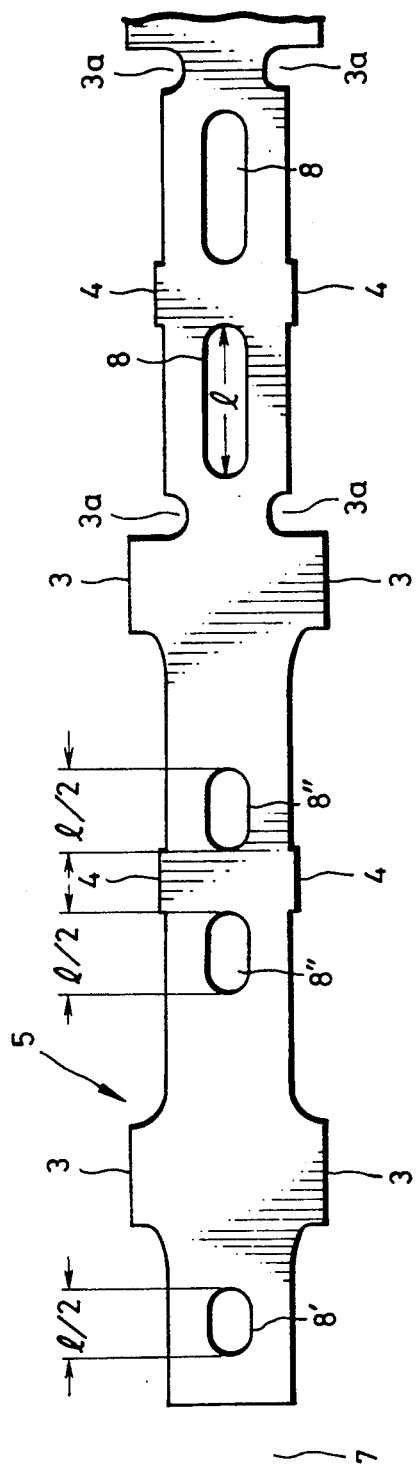
FIG. 1 is a view of an expander to be used in a combined oil ring assembly according to the present invention.
Figure 2:
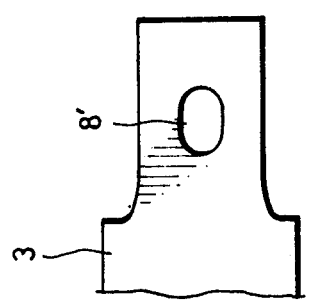
FIG. 2 is a sectional view of a combined oil ring assembly.
Figure 2:
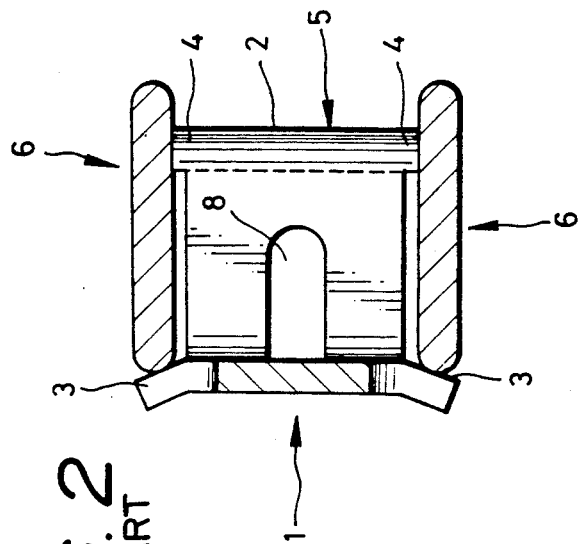

The expander 5 of the combined oil ring assembly to which the present invention has been applied is illustrated in FIG. 1. Like numerals are applied to the components in the typical prior art expander shown in FIG. 3 and the explanation thereof is not repeated here.

Figure 3:
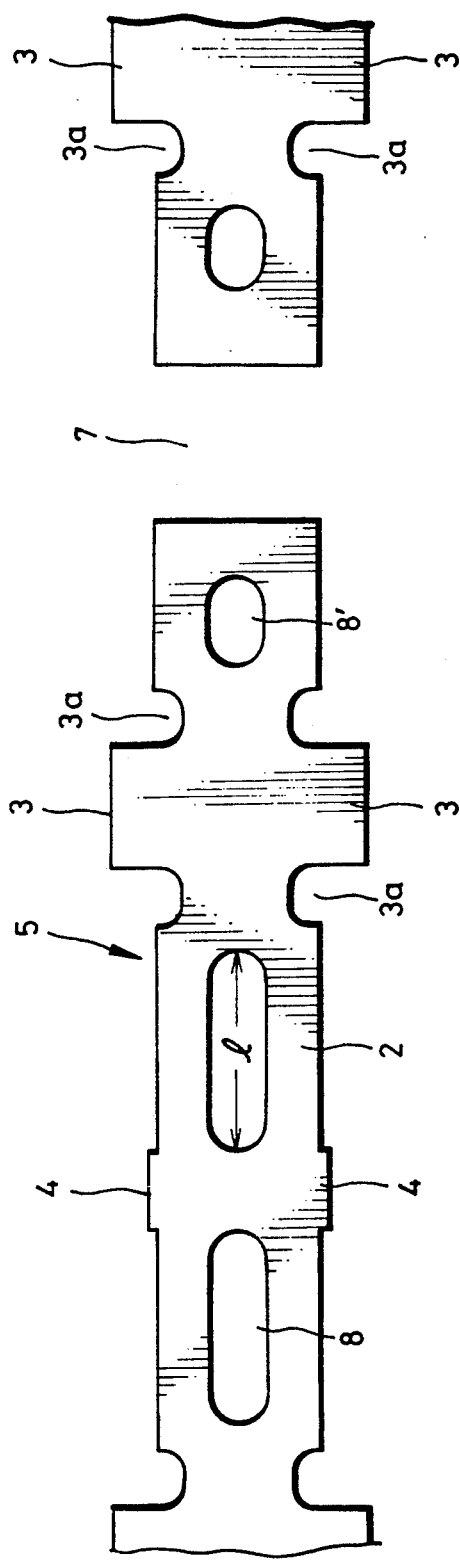
FIG. 3 is a view of the expander of the assembly according to the prior art.
Figure 4:
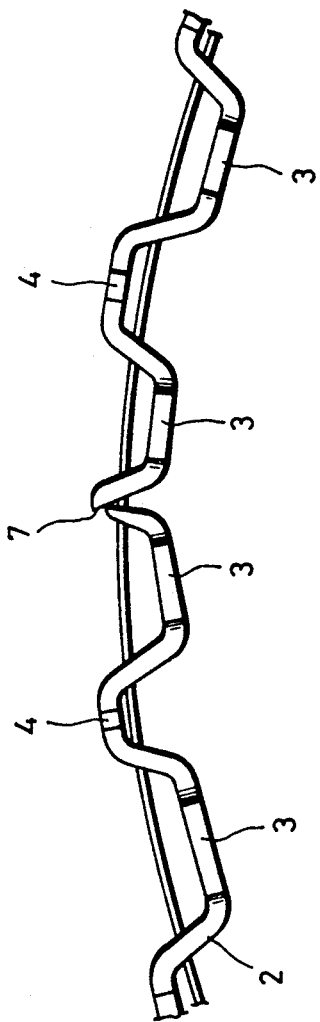
FIG. 4 is the partial plan view of an expander formed into corrugations for use in an oil ring assembly.

In the expander of the invention, the oil releasing bores 8' located near the opposed ends 7 remain the same as those shown in FIG. 3. However, the circumferential lengths of the oil releasing bores 8'' located between the ear portions 3 nearest to the opposed ends 7 and the next ear portions 3 are between 0.5–0.7 times the circumferential length l of the other oil releasing bores 8 as shown in FIG. 1. Preferably they are one-half the length l of bores 8. The side edges or opposing end portions of the shorter oil releasing bores 8'' are still located on a line connecting the side edges of the upper and lower rail seating portions 4. As a result, a larger dimension is provided the expander between the ear portions 3 adjacent the opposed ends 7 and the next ear portions providing greater strength to the expander in this area.

Further, the cut-out portions 3a which are located on each side of the upper and lower rail engaging ear portions 3 adjacent to the opposed ends 7 have been eliminated. Furthermore, the upper and lower cut-out portions 3a at least on the side of the next ear portions 3 that face toward the opposed ends 7 have also been eliminated. This helps to further strengthen the expander in the region adjacent the abutting ends.

A test was conducted to compare the frequency of breakage of combined oil ring assemblies using expanders of the prior art as shown in FIG. 3 with assemblies using expanders of the present invention as shown in FIG. 1. The combined oil ring assemblies were subjected in use to amplitude strokes of 1.0 mm, 1.5 mm and 2.0 mm respectively in the circumferential direction from the outer circumference at the rate of 70 times per second. The following table sets forth the quantity of the combined oil rings tested that were broken before $10^5$ times of amplitude or wobbling strokes.

RESULT OF BREAKAGE TEST
(Ten oil rings of each type were tested)

| Wobbling Stroke (mm) | Prior Art | Invention |
| --- | --- | --- |
| 1.0 | 0 | 0 |
| 1.5 | 3 | 0 |
| 2.0 | 7 | 0 |

As is clear from the foregoing table, breakage of the expander is considerably reduced by constructing it according to the present invention.

It was further found that a combined oil ring assembly using the improved expander exhibits substantially the same values of oil consumption as that of the prior art expander or even somewhat lower values in high reciprocation frequency. Furthermore, the adaptability of the expander to the inner wall of the cylinder exhibits somewhat better tendencies than the prior art expander. Accordingly, the present invention is capable of preventing breakage of the expander while keeping the oil consumption and the adaptability at the same or even more favorable levels than the prior art.

What is claimed:

1. In a combined oil ring assembly comprising an expander and a pair of side rails, in which the expander has a base portion extending in a circumferential direction and terminating in a pair of opposed and abutting ends, said base portion having an upper side and a lower side and being formed into a plurality of corrugations extending in the radial direction and having a plurality of rail engaging ear portions spaced from each other in the circumferential direction on its upper and lower sides on the inner circumference of the corrugated base portion and rail seating portions on its upper and lower sides located between said ear portions on the outer circumference of the corrugated base portion, said side rails resting on said rail seating portions and resiliently abutting against said rail engaging ear portions, and in which a plurality of oil releasing bores extending circumferentially are provided in the base portion of said expander, the improvement comprising providing shorter oil releasing bores between the opposed ends and said rail engaging ear portions nearest to said opposed ends as well as between said nearest rail engaging ear portions and the next adjacent rail engaging ear portions, said shorter oil releasing bores having a circumferential length equal to 0.5 to 0.7 times the circumferential length of the remaining oil releasing bores in the base portion of the expander, and cut-out portions on opposite sides of each of said upper and lower rail engaging ear portions of the expander except at least on either side of both the upper and lower rail engaging ear portions nearest to said opposed ends.

2. The combined oil ring assembly of claim 1, wherein there are also no cut-out portions on the sides of the next adjacent upper and lower rail engaging ear portions that face the opposed ends of the expander.

3. The combined oil ring assembly of claim 1, wherein two oil releasing bores are provided between the said nearest ear portions and the said next adjacent ear portions, the end portions of said two bores that face each other being located on lines connecting the side edges of the upper and lower rail seating portions located between the two said ear portions.

4. The combined oil ring assembly of claim 1, wherein said shorter oil releasing bores are 0.5 times the circumferential length of the remaining bores.

* * * * *